(12) United States Patent
Burchell et al.

(10) Patent No.: US 9,469,488 B1
(45) Date of Patent: Oct. 18, 2016

(54) ARTICLE CONVEYOR SYSTEM WITH AUTOMATIC EJECTION OF FALLEN AND TIPPED ARTICLES

(71) Applicant: SEETECH SYSTEMS, INC., York, PA (US)

(72) Inventors: Victor Howard Burchell, York, PA (US); James Harper Moffitt, York, PA (US)

(73) Assignee: SEETECH Systems, Inc., York, PA (US)

( * ) Notice: Subject to any disclaimer, the term of this patent is extended or adjusted under 35 U.S.C. 154(b) by 0 days.

(21) Appl. No.: 14/964,848

(22) Filed: Dec. 10, 2015

(51) Int. Cl.
*B65G 47/52* (2006.01)
*B65G 51/02* (2006.01)
*B65G 51/03* (2006.01)
*B65G 47/34* (2006.01)
*B65G 15/24* (2006.01)

(52) U.S. Cl.
CPC ............. *B65G 51/035* (2013.01); *B65G 15/24* (2013.01); *B65G 47/34* (2013.01); *B65G 47/525* (2013.01); *B65G 51/02* (2013.01)

(58) Field of Classification Search
CPC ... B65G 51/035; B65G 47/525; B65G 51/02
See application file for complete search history.

(56) References Cited

U.S. PATENT DOCUMENTS

| | | | | |
|---|---|---|---|---|
| 3,610,399 A | | 10/1971 | Friedrich | |
| 4,944,635 A | * | 7/1990 | Carlier | B65G 47/5104 406/10 |
| 5,009,550 A | * | 4/1991 | Hilbish | B65G 47/682 209/656 |
| 5,100,265 A | * | 3/1992 | Mirkin | B65G 51/035 406/79 |
| 5,172,800 A | * | 12/1992 | Brown | B65G 47/2445 198/380 |
| 6,062,773 A | * | 5/2000 | Ouellette | B65G 51/035 406/79 |
| 6,250,851 B1 | * | 6/2001 | Ouellette | B65G 15/14 198/463.3 |
| 6,401,904 B1 | * | 6/2002 | Risley | B07C 5/362 198/380 |
| 7,322,458 B1 | * | 1/2008 | McDonald | B29C 49/4205 198/389 |
| 7,553,110 B2 | * | 6/2009 | Minami | B65G 47/1421 198/391 |
| 9,004,821 B2 | * | 4/2015 | Garner | B65G 51/03 406/87 |
| 9,254,967 B2 | * | 2/2016 | Blochmann | B65G 47/847 |
| 2009/0175691 A1 | * | 7/2009 | Hirschek | B65G 51/035 406/88 |

* cited by examiner

*Primary Examiner* — Thomas Randazzo
(74) *Attorney, Agent, or Firm* — Hooker & Habib, P.C.

(57) ABSTRACT

An article conveyor system for conveying a singulated row of articles includes an upstream belt conveyor, a downstream belt conveyor spaced apart from the upstream belt conveyor by an air gap, and an air conveyor bridging the air gap from the upstream belt conveyor to the downstream belt conveyor. The air conveyor receives upright articles from the upstream belt conveyor and conveys them over the air gap to the downstream belt conveyor. Tipped or fallen articles on the upstream belt conveyor are not received by the air conveyor and fall into the air gap, thereby being ejected from the article conveyor system.

20 Claims, 2 Drawing Sheets

ARTICLE CONVEYOR SYSTEM WITH AUTOMATIC EJECTION OF FALLEN AND TIPPED ARTICLES

FIELD OF THE DISCLOSURE

The disclosure relates generally to conveyers for conveying a line of upright articles (containers, bottles, or like objects), and more specifically, to conveyors that automatically eject tipped or fallen articles from the line of articles.

BACKGROUND OF THE DISCLOSURE

Empty articles, such as bottles or other types of containers, are often conveyed as a singulated row of upright articles supported on a conveyor belt that moves the articles along a conveyor path.

Articles or groups of articles may fall or tip over while being conveyed and block further movement of upstream articles.

Friedrich, U.S. Pat. No. 3,610,399 discloses a conveyor having a pair of side fences that move articles partially off the conveyor belt to eject fallen articles off the conveyor belt. Using side fences to move articles partially of the conveyor belt cannot be used with some bottle shapes.

SUMMARY OF THE DISCLOSURE

Disclosed is an article conveyor system that automatically ejects fallen or tipped articles from the conveyor system. The article conveyor system uses an air conveyor that conveys upright articles over an air gap. Fallen or tipped articles that cannot be received by the air conveyor fall into the air gap and are thereby ejected from the system.

A disclosed embodiment of an article conveyor system for conveying articles in a downstream direction along a conveyor path includes a first belt conveyor, a second belt conveyor, and an air conveyor. The first belt conveyor extends along and defines an upstream portion of the conveyor path. The second belt conveyor extends along and defines a downstream portion of the conveyor path. The air conveyor extends along and defines an intermediate portion of the conveyor path between the upstream and downstream conveyor paths.

The first belt conveyor is spaced apart from the second belt conveyor by an air gap between the first belt conveyor and the second belt conveyor. The air gap is sufficient to separate the upstream conveyor path and the downstream conveyor path, that is, articles cannot bridge the air gap.

The air conveyor bridges the air gap between the first belt conveyor and the second belt conveyor and connects the upstream conveyor path and the downstream conveyor path. The air conveyor receives upright articles being conveyed by the first belt conveyor and is unable to receive tipped or fallen articles being conveyed by the first belt conveyor. Tipped or fallen articles remain on the first conveyor belt and then fall into the gap and are ejected from the article conveyor.

The air conveyor may include an air duct and slide rails that support articles being carried by the air conveyor. Air discharged from the air duct impinge against articles on the slide rails to move the articles in a downstream direction along the slide rails. Embodiments of the air conveyor system have upright articles on the first belt conveyor being received by the slide rails upstream from the air duct so that discharge air does not interfere with the transfer of articles from the first belt conveyor to the air conveyor. Embodiments of the air conveyor system have articles discharged from the slide rails to the second belt conveyor downstream from the air duct so that the discharge air does not interfere with the transfer of articles from the slide rails to the second belt conveyor. Baffles may be provided along the slide rails downstream from the air duct to assist in preventing discharge air from interfering with article transfer off of the air conveyor.

In possible embodiments the position of the air conveyor relative to the belt conveyors or the spacing of the slide rails with respect to one another is adjustable for conveying articles having different heights or other variable geometries.

The disclosed article conveyor system is very efficient and can be used with any article having a neck or similar geometry that can be conveyed by an air conveyor without regard to the shape of the article body. The article conveyor can be readily adjusted between article runs to accommodate conveying different-sized articles.

Other objects and features of the disclosure will become apparent as the description proceeds, especially when taken in conjunction with the accompanying drawing sheets illustrating one or more illustrative embodiments.

DETAILED DESCRIPTION

Figure 3:
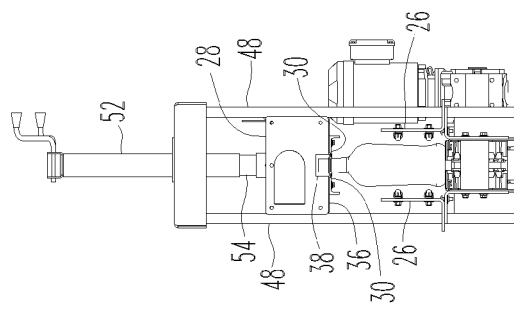
FIGS. 1-3 are top, front, and side views of an article conveying system, the system being shown conveying a number of upright bottles.
Figure 1:
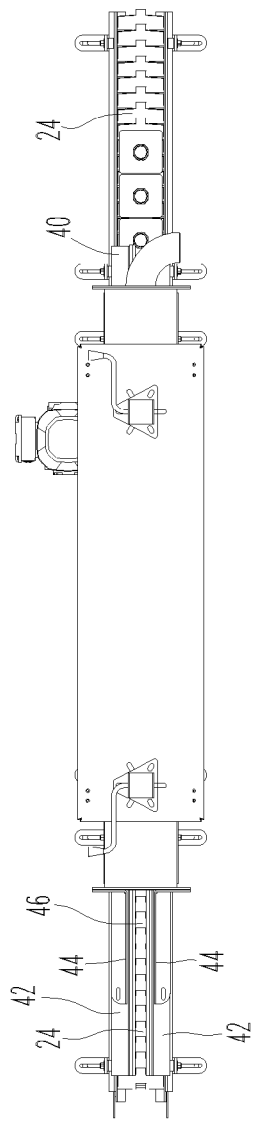
Figure 2:
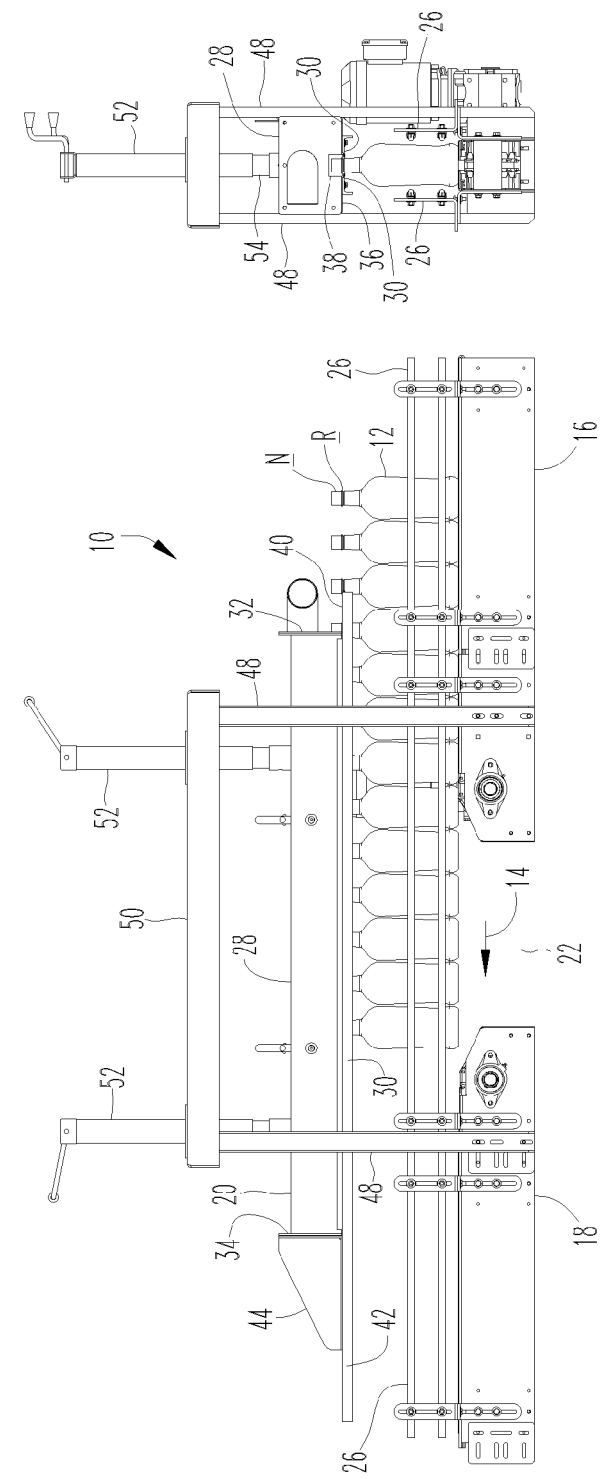

FIGS. 1-3 illustrate an embodiment of an article conveyor system 10. The conveyor system 10 is shown conveying a number of articles 12 arranged in a singulated row of articles in a downstream direction along a conveyor path as indicated by the arrow 14. The illustrated articles 12 are empty plastic blow-molded bottles that are positioned in a nominal upright orientation for conveying. Each bottle has a neck ring R and an upper neck portion N extending from the neck ring to an upper end of the bottle.

The article conveyor system 10 includes a first belt conveyor 16, a second belt conveyor 18, and an air conveyor 20, each extending along and forming portions of the conveyor path 14. The bottles 12 enter the conveyor path 14 at an upstream end (not shown) of the first belt conveyor 16, are conveyed along the conveyor path 14 by the article conveyor system 10, and are discharged from the conveyor path 14 at a downstream end (not shown) of the second belt conveyor 18.

The first belt conveyor 16 defines an upstream portion of the conveyor path 14. The second belt conveyor 18 defines a downstream portion of the conveyor path 14. The air conveyor 20 defines an intermediate portion of the conveyor path 14 that connects and joins the upstream and downstream conveyor path portions.

The first belt conveyor 16 is spaced apart from the second belt conveyor 18 by an air gap 22. The air gap 22 is sufficient to separate the upstream conveyor path from the downstream conveyor path, that is, the air gap 22 is sized such that no article being conveyed by the conveyor system 10 can bridge the gap 22 between the conveyor belts of the belt conveyors 16, 18.

The air conveyor 20 bridges the air gap 22, transferring bottles from the first belt conveyor 16 to the second belt conveyor 18. The air conveyor 20 extends over a downstream end portion of the first belt conveyor 16 and receives bottles from the first conveyor belt 16 before the bottles leave the first conveyor belt 16. The air conveyor 20 extends over an upstream end portion of the second belt conveyor 18 and bottles are discharged from the air conveyor 20 after being deposited on the second belt conveyor 18.

A bottle is conveyed along the upstream portion of the conveyor path by the first belt conveyor 16, is conveyed along the intermediate portion of the conveyor path over the air gap 22 by the air conveyor 20, and is conveyed along the downstream portion of the conveyor path by the second downstream conveyor belt 18. Except when transitioning from the upstream portion to the intermediate portion of the conveyor path and when transitioning from the intermediate portion to the downstream portion of the conveyor path, the bottle is being conveyed along the conveyor path solely by one of the belt conveyors 16, 18 or by the air conveyor 20. During the transition from the upstream conveyor path to the intermediate conveyor path, the bottle is being conveyed by both the first belt conveyor 16 and the air conveyor 20. During the transition from the intermediate conveyor path to the downstream conveyor path the bottle is being conveyed by both the second conveyor belt 18 and the air conveyor 20.

Each belt conveyor 16, 18 is a conventional belt conveyer having an endless conveyor belt 24 having an upper belt run that moves along the conveyor path 14 and supports the bottles 12 being conveyed on the belt conveyor. The conveyor belt is conventional and the conveyor belt design chosen for use can best fit the user's needs. The illustrated belts 24 are made of articulated links that enable the belt to move around curves. Unarticulated belts with flat conveyor belt runs that define straight conveyor paths may also be used in other embodiments. Each belt conveyor 16, 18 may include conventional side fences 26 placed on opposite sides of the conveyor belt and extending along the length of the conveyor belt to resist tipping of bottles.

The air conveyor 20 includes a conventional pressurized air duct 28 connectable to receive air from a source of pressurized air (not shown) and a pair of spaced-apart, parallel neck guides or slide rails 30 that extend along the conveyor path 14 and support the neck ring R of bottles being conveyed on the air conveyor 20. The slide rails 30 support the bottles as the bottles are being conveyed over the air gap 22. The spacing of the slide rails 30 from one another can be adjusted in a conventional manner to accommodate neck rings of varying diameters.

The air duct 28 extends along the conveyor path 14, the length of the air duct 28 being defined by a front wall 32 and a rear wall 34. A bottom wall 36 defining a "U" shaped channel 38 extending the length of the air duct 28. The slide rails 30 are mounted to the bottom wall 36 on opposite sides of the channel 38 so that the necks of the bottles 12 while moving along the air duct 28 are received in the channel 38. Discharge openings (not shown) in the channel wall direct air streams into the channel 38 that impinge against bottles held on the slide rails 30 and urge the bottles to move in the downstream direction along the conveyor path.

The slide rails 30 extend beyond both the front end wall 32 and the rear end wall 34, the slide rails 30 having upstream portions 40 and downstream portions 42.

A pair of like baffles 44 formed from flat plates extend away from the rear wall 34 and extend towards the downstream end of the slide rails 30. The baffles 44 are mounted on the members forming the slide rail portions 40 so that adjusting the spacing of the slide rails also adjusts the spacing of the baffles. The baffles 44 face one another and extend parallel with the slide rails 30, defining a channel 46 between them and extending downstream from the rear duct wall 34 that receive the necks of bottles moving along the slide rails 30. Each baffle 44 extends at least the full height of the air duct 20 to accommodate different sized channels 38, and taper downwardly as the baffles extend downstream.

The air conveyor 20 is fixed above the belt conveyors 16, 18 by a frame having vertical support struts or columns 48 attached to the belt conveyors 16, 18 and an upper crossbeam 50 attached to the strut 48. A pair of manually-operated jacks 52 mounted on the beam 36 have telescoping plungers 54 that carry the air duct 28 and attached slide rails 30. The plungers 54 move vertically parallel with the struts 48. The jacks 52 enable adjustment of the vertical position of the air duct 28 relative to the conveyor belts 24 so that the spacing of the slide rails 30 above the conveyor belts 32 can be set for different-sized bottles. Bottle neck rings R can be smoothly received by the slide rails 30 within a range of bottle heights.

In other embodiments the jacks 52 can be electrically operated.

In operation of the article conveyor system 10, the upstream portions 40 of the slide rails 30 receive a bottle neck ring R of an upright bottle while the bottle is still being supported on the upstream belt conveyor 16. This provides for a smooth transition from the upstream belt conveyor 16 to the air conveyor 20. The upstream belt conveyor 16 drives the bottles along the slide rail portions 40 until the bottles reach the air duct channel 38. The bottle is also being first received on the slide rails 30 while the bottle is also spaced away from the air duct 20. This prevents the air being discharged into the air duct channel 38 from influencing the upright orientation of the bottle in a way that might interfere with the transition of the bottle onto the slide rails 30.

Pressurized air being discharged from the air duct 20 moves the bottles supported on the slide rails 36 along the air duct 20 and over the air gap 22. Bottles while over the air gap 22 are supported solely by the slide rails 36 and are driven by the air conveyor 20 at the same conveying speed as the upstream and downstream belt conveyors 16, 20.

The bottle reaches the conveyor belt 22 of the downstream belt conveyor 18 before the bottle is discharged from the air duct channel 38. This provides for a smooth transition of the upright bottle from the air conveyor 20 to the downstream belt conveyor 18. The bottle is discharged from the air conveyor 20 downstream from the air duct 20 when it is spaced away from the duct rear wall 34. This prevents air discharged into the duct channel 38 from urging the bottle to tip away from its upright position as the bottle is moving off the slide rails 30 and onto the downstream belt conveyor 18. The baffles 44 help reduce the possibility of discharge air from the duct channel 38 impinging against the body of the bottle and urging the bottle to tip while the bottle is being transferred to the downstream belt conveyor 20.

Figure 4:
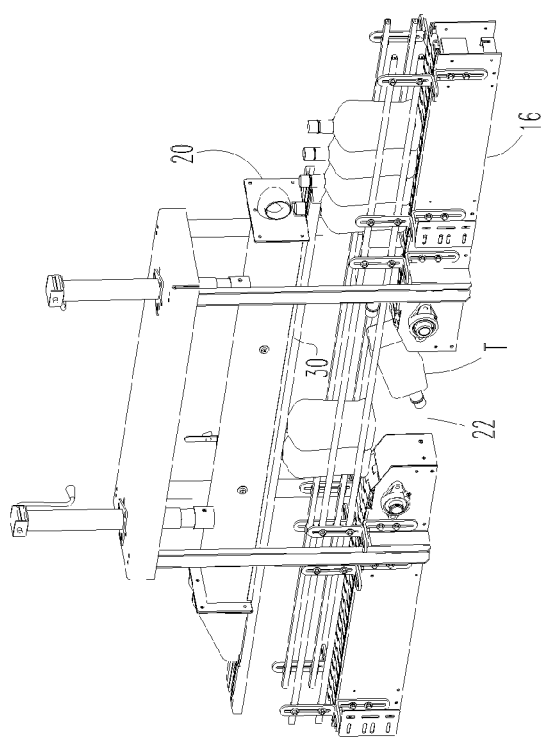
FIGS. 4 and 5 illustrate the article conveying system shown in FIGS. 1-3 ejecting a fallen bottle.
Figure 5:
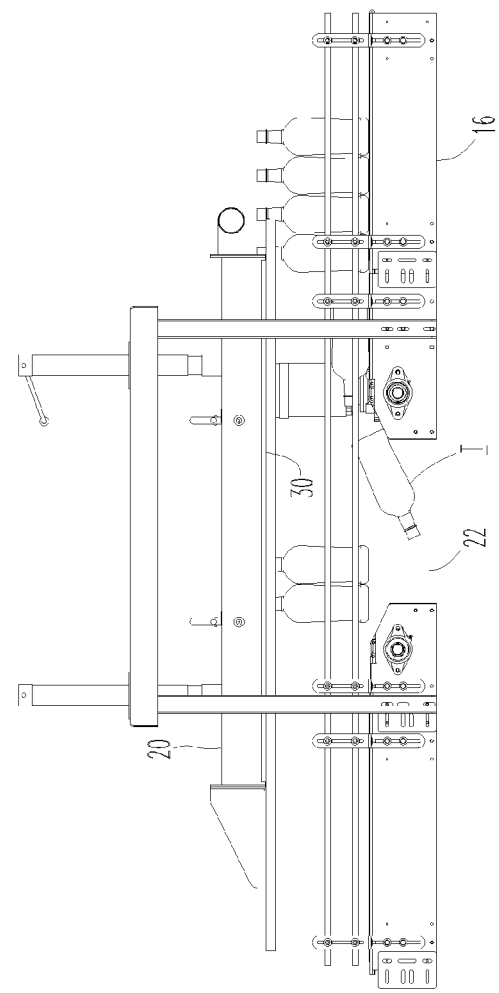

FIGS. 4 and 5 illustrate discharge of a tipped bottle T carried on the upstream belt conveyor 16 from the article conveyor system 10. The tippled bottle T below the slide rails and so the neck ring of the tippled bottle T cannot be received on the slide rails 30 for transfer of the bottle to the air conveyor 20. The tipped bottle T remains on the conveyor belt of the upstream conveyor belt 16 until the bottle reaches the air gap 22 and falls into the air gap 22, the bottle T thereby automatically ejected from the article conveyor system 10.

The air conveyor is positioned relative to the belt conveyors 16, 18 to receive upright articles of a maximum article height—that is, taller articles would impact the air duct 20. The length of the air gap 22 between the belt conveyors 16, 18 is sized so that a tipped article on the upstream conveyor belt 16 cannot bridge the gap and must fall into the air gap 22. That is, in possible embodiments the air gap separates the upstream and downstream belt conveyors 16, 18 by more than the article height. Preferably the length of the air gap is not more than 1.5 to 2 times the minimum length required to prevent bridging to minimize the length of the air conveyor 20. That is, in possible embodiments the air gap separates the upstream and downstream belt conveyors by not more than twice article height.

Preferably the location of the air conveyor 20 along the conveyor path 14 is selected to be away from process areas or other environmental or factory areas that might generate drafts or other disturbances urging the bottles to tip or fall when transferring to and from the air conveyor 20.

While one or more embodiments have been disclosed and described in detail, it is understood that this is capable of modification and that the scope of the disclosure is not limited to the precise details set forth but includes modifications obvious to a person of ordinary skill in possession of this disclosure and also such changes and alterations as fall within the purview of the following claims.

What is claimed is:

1. An article conveyor for conveying articles in a downstream direction along a conveyor path, the article conveyor comprising:
    a first belt conveyor, a second belt conveyor, and an air conveyor;
    the first belt conveyor extending along and defining an upstream portion of the conveyor path, the second belt conveyor extending along and defining a downstream portion of the conveyor path, the air conveyor extending along and defining an intermediate portion of the conveyor path between the upstream and downstream conveyor paths;
    the first belt conveyor being spaced apart from the second belt conveyor by an air gap being disposed between the first belt conveyor and the second belt conveyor, the air gap being sufficient to separate the upstream conveyor path and the downstream conveyor path;
    the air conveyor bridging the gap between the first belt conveyor and the second belt conveyor, the air conveyor connecting the upstream conveyor path and the downstream conveyor path, the air conveyor being disposed to receive upright articles being conveyed by the first belt conveyor and not receive tipped articles being conveyed by the first belt conveyor whereby tipped articles fall into the gap and are ejected from the article conveyor.

2. The article conveyor of claim 1 wherein the air conveyor comprises an air duct and slide rails that support articles being conveyed by the air conveyor, the air duct having spaced apart forward and rear ends, the slide rails extending in an upstream direction along the conveyor path away from the air duct to upstream ends of the slide rails so as to receive articles from the upstream belt conveyor onto the slide rails while the articles are spaced away from the air duct.

3. The article conveyor of claim 2 wherein an upright article being received by the upstream end of the slide rails is also being supported by the upstream belt conveyor.

4. The article conveyor of claim 1 wherein the air conveyor comprises an air duct and slide rails that support articles being conveyed by the air conveyor, the slide rails extending in a downstream direction along the conveyor path away from the air duct to downstream ends of the slide rails so as to discharge articles from the slide rails after the articles have been spaced away from the air duct.

5. The article conveyor of claim 4 wherein an article being discharged from the downstream ends of the slide rails is also being supported by the downstream belt conveyor.

6. The article conveyor of claim 4 comprising a pair of baffles extending downstream along the conveyor path from the rear wall of the air duct, the baffles extending away from the slide rails and defining a channel therebetween that extends along the conveyor path.

7. The article conveyor of claim 6 wherein the baffles comprise flat plates facing one another.

8. The article conveyor of claim 1 wherein the air conveyor comprises an air duct mounted on a frame and slide rails mounted to the air duct, the air duct movably mounted to the frame for movement towards and away from the upstream and downstream conveyor belts.

9. The article conveyor of claim 8 wherein the frame comprises a plurality of shafts extending along respective shaft axes, the air duct movable parallel to the shaft axes.

10. The article conveyor of claim 8 comprising one or more jacks mounted to the frame, each jack comprising a plunger movable with respect to the frame, the air duct attached to the plungers of the one or more jacks for relative movement with respect to the frame.

11. The article conveyor of claim 1 wherein the air conveyor is configured to convey an article having an article height and the air gap separates the upper and lower belt conveyors by a distance not less than the article height.

12. The article conveyor of claim 11 wherein the air gap separates the upstream and downstream belt conveyors by a distance not more than twice the article height.

13. A method of ejecting fallen articles from an article conveyor system, the method comprising the steps of:
    (a) conveying the articles on a first belt conveyor towards a downstream end of the first belt conveyor;
    (b) transferring the articles on the first belt conveyor to an air conveyor before the articles reach the downstream end of the first belt conveyor, the air conveyor being configured to receive upright articles on the first belt conveyor and to not receive fallen article on the first belt conveyor;
    (c) conveying the articles received by the air conveyor along a conveyor path extending from the first belt conveyor and to a second belt conveyor, the second belt conveyor spaced apart from the first belt conveyor by an air gap, the air conveyor conveying the articles received by the air conveyor across the air gap to the second belt conveyor;
    (d) discharging the articles received by the air conveyor onto the second belt conveyor; and
    (e) conveying the fallen articles on the first belt conveyor to the downstream end of the first belt conveyor and discharging the fallen articles from the first belt conveyor into the air gap whereby the fallen articles are ejected from the article conveyor system.

14. The method of claim 13 wherein upright articles being received by the air conveyor are also being supported on the first belt conveyor before the articles reach the downstream end of the first belt conveyor.

15. The method of claim 13 wherein articles received by the air conveyor are supported on the second belt conveyor before being discharged from the air conveyor.

16. The method of claim 13 wherein the air conveyor is configured to receive an article having a maximum article height from the first belt conveyor, the air gap separating the first and second belt conveyors by a distance not less than the maximum article height and not more than twice the maximum article height.

17. The method of claim 13 wherein the air conveyor comprises an air duct that discharges air from openings formed in the air duct and slide rails that support articles being conveyed by the air conveyor, the slide rails receiving upright articles from the first belt conveyor while the upright articles are spaced upstream from the air duct, the slide rails discharging articles from the air conveyor to the second belt conveyor after the articles have moved downstream away from the air duct.

18. The method of claim 17 wherein the air conveyor comprises baffles extending downstream from the air duct, the baffles defining a channel that receives at least a portion of the articles being conveyed by the air conveyor after the articles are downstream from the air duct.

19. The method of claim 13 including the step of conveying a first set of articles along the conveyor path, the air conveyor being in a first operating position with respect to the first and second belt conveyors while conveying the first set of articles, changing the position of the air conveyor relative to the first and second belt conveyors to a second operating position different from the first operating position before conveying a second set of articles, and conveying the second set of articles along the conveyor path, the air conveyor being in the second operating position while conveying the second set of articles.

20. The method of claim 19 wherein the step of changing the position of the air conveyor comprises the step of telescoping one member relative to another member.

* * * * *